United States Patent
Abielmona et al.

(10) Patent No.: US 8,478,711 B2
(45) Date of Patent: Jul. 2, 2013

(54) SYSTEM AND METHOD FOR DATA FUSION WITH ADAPTIVE LEARNING

(75) Inventors: Rami Abielmona, Ottawa (CA); George Di Nardo, Manotick (CA)

(73) Assignee: Larus Technologies Corporation, Ottawa, Ontario (CA)

( * ) Notice: Subject to any disclaimer, the term of this patent is extended or adjusted under 35 U.S.C. 154(b) by 308 days.

(21) Appl. No.: 13/030,270

(22) Filed: Feb. 18, 2011

(65) Prior Publication Data

US 2012/0215735 A1    Aug. 23, 2012

(51) Int. Cl.
- G06F 9/44 (2006.01)
- G06N 7/02 (2006.01)
- G06N 7/06 (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS

| | | | |
|---|---|---|---|
| 5,307,444 A | 4/1994 | Tsuboka | |
| 5,920,839 A | 7/1999 | Iso | |
| 5,963,653 A | 10/1999 | McNary et al. | |
| 6,151,574 A | 11/2000 | Lee et al. | |
| 6,345,265 B1 | 2/2002 | Thiesson et al. | |
| 6,801,662 B1 | 10/2004 | Owechko et al. | |
| 6,944,317 B2 | 9/2005 | Pavlovic et al. | |
| 6,993,462 B1 | 1/2006 | Pavlovic et al. | |
| 6,999,601 B2 | 2/2006 | Pavlovic et al. | |
| 7,043,075 B2 | 5/2006 | Gutta | |
| 7,076,102 B2 | 7/2006 | Lin et al. | |
| 7,091,409 B2 | 8/2006 | Li et al. | |
| 7,171,043 B2 | 1/2007 | Nefian | |

(Continued)

FOREIGN PATENT DOCUMENTS

| | | |
|---|---|---|
| CA | 2179801 | 12/1996 |
| CA | 2499513 | 4/2004 |

(Continued)

OTHER PUBLICATIONS

Smith, Duncan, et al., "Approaches to Multisensor Data Fusion in Target Tracking: A Survey", IEEE Transactions on Knowledge and Data Engineering, Dec. 2006, pp. 1696-1710, vol. 18, No. 12, IEEE Computer Society.

(Continued)

*Primary Examiner* — Kakali Chaki
*Assistant Examiner* — Ababacar Seck
(74) *Attorney, Agent, or Firm* — McDonnell Boehnen Hulbert & Berghoff LLP

(57) ABSTRACT

There are disclosed techniques for performing data fusion. In one embodiment, the technique comprises: (a) receiving an input; (b) processing the input in accordance with parameters of a stochastic model to derive a state of a stochastic process of the stochastic model, the parameters of the stochastic model previously established during a training period; (c) obtaining a predicted next state of the stochastic process; (d) receiving a next input and processing the next input in accordance with the parameters of the stochastic model to derive a next state of the stochastic process; (e) comparing either (i) the next state and the predicted next state, or (ii) the next input and a predicted next input corresponding to the predicted next state; and (f) if there is a discrepancy between that compared in (e), then using the next input to modify the parameters of the stochastic model.

14 Claims, 11 Drawing Sheets

U.S. PATENT DOCUMENTS

| | | | |
|---|---|---|---|
| 7,203,368 B2 | 4/2007 | Nefian | |
| 7,203,635 B2 | 4/2007 | Oliver et al. | |
| 7,209,883 B2 | 4/2007 | Nefian | |
| 7,280,696 B2 | 10/2007 | Zakrzewski et al. | |
| 7,313,269 B2 | 12/2007 | Xie et al. | |
| 7,359,836 B2 | 4/2008 | Wren | |
| 7,542,949 B2 | 6/2009 | Wren | |
| 7,561,991 B2 | 7/2009 | Matsunaga et al. | |
| 7,583,815 B2 | 9/2009 | Zhang et al. | |
| 7,599,952 B2 | 10/2009 | Parkinson | |
| 7,634,361 B2 | 12/2009 | Levesque et al. | |
| 7,657,102 B2 | 2/2010 | Jojic et al. | |
| 7,715,591 B2 | 5/2010 | Owechko et al. | |
| 7,725,565 B2 | 5/2010 | Li et al. | |
| 7,737,857 B2 | 6/2010 | Ebert et al. | |
| 7,747,364 B2 | 6/2010 | Roy et al. | |
| 7,784,099 B2 | 8/2010 | Benjamin | |
| 7,796,029 B2 | 9/2010 | Ma et al. | |
| 2005/0047664 A1 | 3/2005 | Nefian | |
| 2009/0006289 A1 | 1/2009 | Jaros | |
| 2009/0040367 A1* | 2/2009 | Zakrzewski et al. | 348/370 |

FOREIGN PATENT DOCUMENTS

| | | |
|---|---|---|
| CA | 2499959 | 4/2004 |
| CA | 2512944 | 2/2005 |
| CA | 2563909 | 11/2005 |
| CA | 2576278 | 11/2005 |
| CA | 2569527 | 12/2005 |
| CA | 2634759 | 12/2009 |
| WO | WO0239371 | 5/2002 |
| WO | WO2004034312 | 4/2004 |

OTHER PUBLICATIONS

Olfati-Saber, Reza, "Distributed Kalman Filtering and Sensor Fusion in Sensor Networks", pp. 1-13, Dartmouth College, Thayer School of Engineering, Hanover, NH 03755.

Hawkins, Jeff, et al., "Hierarchical Temporal Memory—Concepts, Theory and Terminology", May 10, 2006, Numenta, Inc.

Valdes, Julio J., "Similarity-Based Heterogeneous Neurons in the Context of General Observation Models", pp. 1-9, National Research Council of Canada.

Abielmona, Rami, et al., "Networking: The Growing Role for Advanced Sensors", Vanguard, Mar./Apr. 2007, p. 23, Larus Technologies Corp.

Bedworth, Mark, et al., "The Omnibus Model: A New Model of Data Fusion?", IEEE AES Systems Magazine, Apr. 2000, pp. 30-36.

Llinas, James, et al., "Revisiting the JDL Data Fusion Model II".

Steinberg, Alan et al., "Revisions to the JDL Data Fusion Model".

USBX Advisory Services, "Critical Infrastructure: The Next Frontier in Homeland Security", Homeland Security Whitepaper, 2006, pp. 1-10, USBX Advisory Services, LLC.

The Data Fusion Subpanel, "Data Fusion Lexicon", Oct. 1991, pp. 1-13.

Dempster, A.P., "A Generalization of Bayesian Inference", Read at a Research Methods Meeting of the Society, Feb. 14, 1968, pp. 205-231, Harvard University and London School of Economics.

Hill, Paul, et al., "Image Fusion using Complex Wavelets", BMVC 2002, pp. 487-496, The University of Bristol, UK.

Jiang, Rong, et al., "Wavelet Based Feature Extraction and Multiple Classifiers for Electricity Fraud Detection", 2002, pp. 2251-2256, IEEE.

Rabiner, Lawrence, R., "A Tutorial on Hidden Markov Models and Selected Applications in Speech Recognition", Proceedings of the IEEE, Feb. 1989, pp. 257-286, vol. 77, No. 2, IEEE.

Hall, David, L., et al., "An Introduction to Multisensor Data Fusion", Proceedings of the IEEE, Jan. 1997, pp. 6-22, vol. 85, No. 1, IEEE.

Vitter, Jeffrey Scott, "Design and Analysis of Dynamic Huffman Codes", Journal of the Association for Computing Machinery, Oct. 1987, pp. 825-845, vol. 34, No. 4, ACM.

Ghahramani, Zoubin, "Factorial Hidden Markov Models", Machine Learning, 1997, pp. 245-273, Kluwer Academic Publishers.

Mackenzie, Dana, et al., "Wavelets—Seeing the Forest—And the Trees", Beyond Discovery, Dec. 2001, pp. 1-8, National Academy of Sciences, USA.

* cited by examiner

SYSTEM AND METHOD FOR DATA FUSION WITH ADAPTIVE LEARNING

FIELD

The present disclosure relates generally to data fusion and more specifically to a method and apparatus for fusing multiple sources of data to derive inferences about the data.

BACKGROUND

Data fusion can be generally defined as the use of techniques that combine data from multiple sources in order to achieve situational assessments or inferences about that data. A data fusion system may, for example, employ a stochastic model for performing the data fusion. Different stochastic models can be used for performing data fusion, including, for example, Hidden Markov Models, Bayesian Networks, and Neural Networks.

Data fusion can be utilized in a wide variety of applications, including both military and non-military. Examples of such applications include: territorial security, monitoring of manufacturing processes, environmental monitoring, command and control, business intelligence, emergency management, and medical applications. For example, in a territorial security system, a plurality of sensors can be positioned, perhaps over a large area, and used to monitor activity in the area. The data from each of the sensors is processed by a data fusion system to make an inference of whether an activity monitored by the sensors warrants taking further action, such as alerting a human security authority.

In applications such as territorial security, it may be necessary for a data fusion system to be able to operate in real-time so that proper inferences can be made and appropriate action can be taken in a suitable amount of time. However, some data fusion systems are too computationally intense to be optimal for territorial security related applications.

Other data fusion systems, which may be suitable for territorial security related applications, must first be trained offline during a training phase using a set of training data consisting of known inputs. The training allows for the generation of model parameters of the data fusion system. Once trained, during subsequent operation in real-time, the data fusion system can receive actual "live" data and make inferences in accordance with established model parameters. However, these model parameters are typically not updated during operation subsequent to the training phase. Rather, if it is desired to update the model parameters at a later time, for example, because the performance of the data fusion system becomes suboptimal due to a growing discrepancy between the training data and the actual input data during operation, the data fusion system must be taken out of operation, and the data fusion system must be re-trained to establish new model parameters.

SUMMARY

There are disclosed methods for performing data fusion in a data fusion engine. In one embodiment, the method comprises: (a) receiving an input at a data fuser in the data fusion engine; (b) processing the input in the data fuser in accordance with parameters of a stochastic model to derive a state of a stochastic process of the stochastic model, the parameters of the stochastic model previously established during a training period; (c) obtaining a predicted next state of the stochastic process; (d) receiving a next input at the data fuser and processing the next input in the data fuser in accordance with the parameters of the stochastic model to derive a next state of the stochastic process; (e) comparing either (i) the next state and the predicted next state, or (ii) the next input and a predicted next input corresponding to the predicted next state and derived from the predicted next state; and (f) if there is a discrepancy between that compared in (e), then using the next input to modify the parameters of the stochastic model.

Systems to implement the data fusion methods are also disclosed, as well as computer readable media having stored thereon computer readable instructions for performing the methods.

BRIEF DESCRIPTION

Embodiments of the present application will be described, by way of example only, with reference to the accompanying figures wherein.

Like reference numerals may be used in different figures to denote similar elements.

DETAILED DESCRIPTION

For illustrative purposes, embodiments will now be explained in greater detail below in conjunction with the figures.

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

A first embodiment is described in the context of a territorial security system. However, as will be explained in detail later, the embodiments described herein are not limited to territorial security applications, but can be utilized in any application that requires data from multiple sources to be fused.

Figure 1:
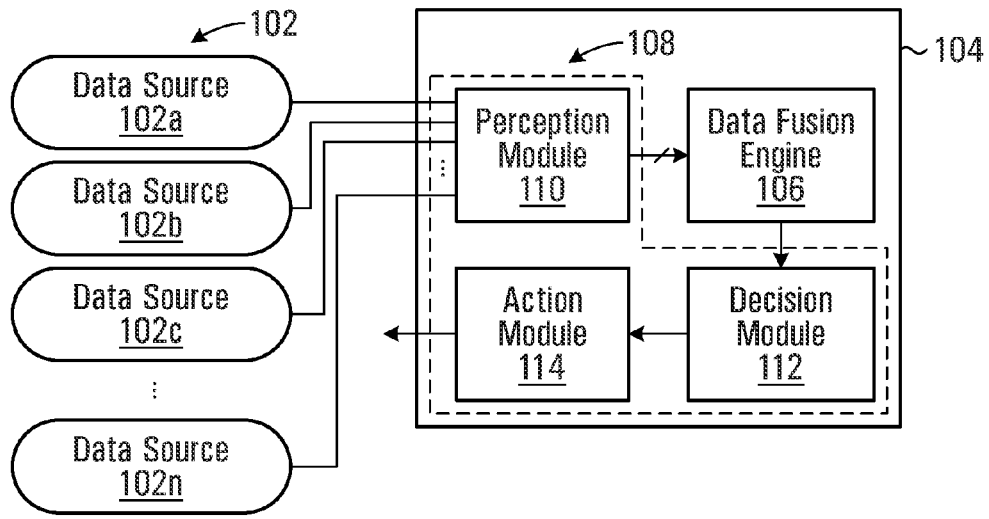
FIG. 1 is a block diagram of a territorial security system having an example implementation of a data fusion engine.

Turning therefore to FIG. 1, there is disclosed a plurality of data sources 102a, 102b, 102c, . . . , 102n, and a territorial security system 104. The data sources 102a, 102b, 102c, . . . , 102n collect (or have already collected historically) data pertaining to an area, object, or event being monitored. The territorial security system 104 processes data from the data sources 102a, 102b, 102c, . . . , 102n to provide territorial security. In general, the data sources 102a, 102b, 102c, . . . , 102n can be multi-type data sources and/or multi-source data sources. That is, depending on the application, each data source 102a to 102n may collect or provide similar and/or dissimilar data. For example, data source 102a may collect sensor data from a motion sensor located in a first area, whereas data source 102b may collect image data from a security camera located in that same area. Data source 102c may collect sensor data from a motion sensor located in a second area, and data source 102n may be an operational report. In this example, data sources 102a and 102c would be multi-source (same type of data, but from different sources), and data sources 102a, 102b, and 102n would be multi-type (different types of data). The data sources 102a, 102b, 102c, . . . , 102n can, for example, be used by the territorial security system 104 to monitor a large geographical area, such as an airport, battlefield, or a geographic border.

Data sources can include both sensors that provide sensor readings about an environment, as well as non-sensed data, for example, data stored in one or more data bases, such as operational reports, Geographic Information System (GIS) information, or some other data pertaining to the area, object, or event being monitored by the territorial security system 104. The sensors may be mobile (e.g. mounted on a mobile platform) or stationary. Moreover, a single data source, such as data source 102a, can represent the output of one or more sources, including, for example, a whole network of sensors. For example, there may be deployed a sensor network composed of multiple interconnected and distributed sensor nodes that work together in a coordinated manner to output a single reading (e.g. a sensor-and-actuator network (SA-NET)). This collected single reading can be considered a single data source.

The territorial security system 104 comprises a data fusion engine 106 and, in some embodiments, supporting architecture 108. In the exemplary embodiment illustrated in FIG. 1, supporting architecture 108 is present and includes a perception module 110, a decision module 112, and an action module 114. The perception module 110 processes the data from the data sources 102a, 102b, 102c, . . . , 102n and forwards the processed data to the data fusion engine 106. For example, in some embodiments, the perception module 110 extracts features from the raw data from the data sources and only forwards these features to the data fusion engine 106. Other functions implemented by the perception module 110 may include: calibration or adjustment of an incoming sensor reading from a particular data source, filtering an incoming data source (e.g. to provide a running average), and/or converting the input from the plurality of data sources 102a, 102b, 102c, . . . , 102n into a homogeneous representation.

The data fusion engine 106 fuses the received data and outputs an inference or "intelligence product". The decision module 112 processes the inference or intelligence product to generate a decision pertaining to the object, area or event being monitored. For example, in some embodiments the decision module 112 could be a look-up table that maps different inferences to different actions. In addition to making decisions on actions, the decision module 112 may also provide instructions for implementing the actions.

The action module 114 coordinates an action response based on the decision generated by the decision module 112. In some embodiments, the action response, for example, provides a communication or an alert to a user-interface for a human security authority, activates other of the data sources 102a, 102b, 102c, . . . , 102n to obtain additional information, and/or modifies the operation of activated sensors. For example, the intelligence product from the data fusion engine 106 may be that a human is present in area A. Based on this information, the decision module 112 generates a decision to alert an authority and activate a security camera in adjacent area B. The action module 114 generates the alert at a user-interface and instructs the camera in area B to activate.

In general, regardless of whether or not there is supporting architecture 108, the intelligence product output by the data fusion engine 106 may be a decision (e.g. "a human is present"), an alert (e.g. a communication to a user-interface for a security authority), a classification (e.g. "car"), or an action (e.g. manipulating the sensors to take in additional data of interest).

In some embodiments the supporting architecture 108 may not be present (or only some of the components may be present), or may be incorporated directly into the data fusion engine 106 itself.

Embodiments of exemplary data fusion engines will now be described in more detail.

Figure 2:
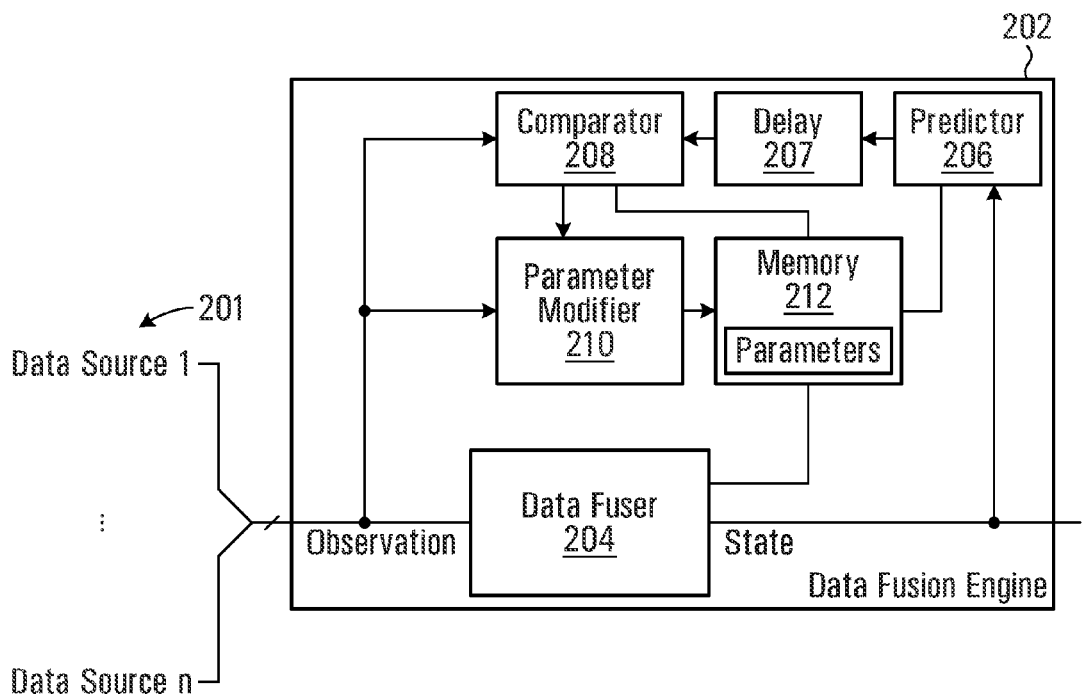
FIG. 2 is a block diagram of an example implementation of a data fusion engine.

Turning to FIG. 2, a first embodiment of an exemplary data fusion engine 202 is shown. The data fusion engine 202 is a representative example of the data fusion engine 106 in the territorial security system 104 in FIG. 1, and the methods described below with reference to the data fusion engine 202 can also be applied to the data fusion engine 106.

The data fusion engine 202 includes a data fuser 204, a predictor 206, a delay block 207, a comparator 208, a parameter modifier 210, and memory 212. The general operation of the data fusion engine 202 will be described below with reference to these components. It will be noted that in this illustrated embodiment, no separate supporting architecture is shown. That is, the data from data sources 201 are directly fed into the data fusion engine 202.

The data fusion method implemented by the data fusion engine 202 utilizes at least one stochastic model. For example, the stochastic model may be a Hidden Markov Model (HMM). The embodiments described below will assume the stochastic model is a HMM. However, other stochastic models can be used instead of, or in addition to, a HMM.

An overview of HMMs can be found, for example, in L. Rabiner, "*A Tutorial on Hidden Markov Models and Selected*

Applications in Speech Recognition", Proc. of IEEE, vol. 77, no. 2, February 1989, incorporated herein by reference. A HMM is a Markov process in which the observation of the process at a given state is a probabilistic function of the state. A HMM is typically defined by the following parameters of the model:

1) N: The number of hidden states.
2) M: The number of distinct observations per state.
3) A: a state transition matrix, representing the probability of moving to another state (or staying in the present state) given the present state.
4) $B_{i,k}$; i=1 ... N, k=1 ... M: The emission probability of an observation k in a state i.

The initial state distribution is also typically included as part of the parameters of the HMM. Additionally, in general, each state may have its own number of distinct observations, in which case the number of distinct observations per state, M, is a function of the state i.

The operation of the data fusion engine 202 is described with reference to FIG. 3. First, in step 302, the data fusion engine 202 is trained during a training phase using predetermined data inputs to establish the HMM parameters (e.g. N, M, A, $B_{i,k}$ and the initial state distribution) for each of the HMM(s) implemented in the data fusion engine 202 and to associate at least some of the states with inferences having meaningful significance. The established model parameters are stored in memory 212. Then in step 304, during operation subsequent to having been trained (i.e. during "operational phase"), the data fusion engine 202 performs data fusion on real "live" data from the data sources and, as described in detail later, continually modifies the established parameters as necessary based on a comparison between a prediction and what is actually received.

Figure 3:
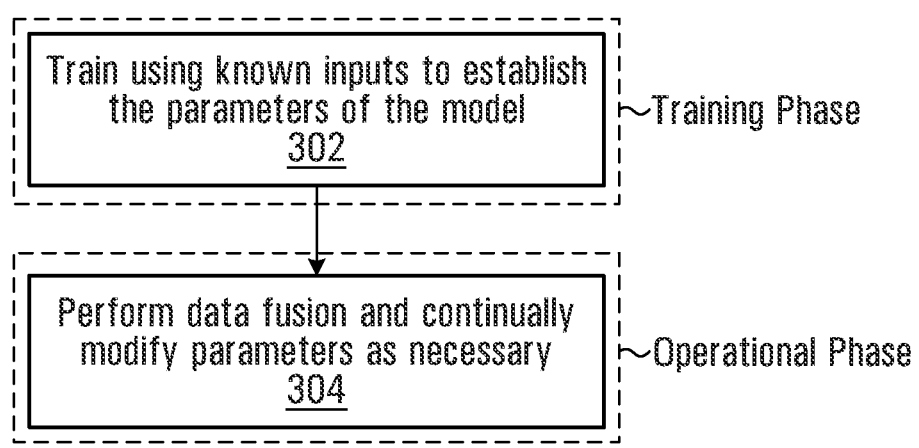
FIG. 3 is a flow diagram of an exemplary operation of a data fusion engine.

As indicated in step 302 of FIG. 3, before operation of the data fusion engine 202 in real-time, it is first necessary to train the data fusion engine 202 to establish the parameters of the HMM(s). One example of a method for training a HMM to establish the parameters of the HMM is described in detail in L. Rabiner, "*A Tutorial on Hidden Markov Models and Selected Applications in Speech Recognition*", *Proc. of IEEE*, vol. 77, no. 2, February 1989. An overview of such a training method is a follows: (1) predetermined sequences of data representative of what might be expected during operation are produced, either artificially or through experimental methods. For example, these sequences may be derived from artificial inputs representative of what would be expected from actual data sources during actual operation in real-time. (2) Each training sequence is considered to be an observation sequence of the HMM. (3) The number of hidden states N is either known or selected randomly, and corresponding HMM parameters (e.g. M, A, $B_{i,k}$, and the initial state distribution described above) are then selected to maximize the probability of the observation sequence given the HMM parameters. The method for selecting corresponding HMM parameters that maximize this probability can be achieved, for example, using the known Baum-Welch algorithm, an equivalent expectation-maximization (EM) method, or using a known gradient or optimization technique. In some expectation-maximization methods (e.g. the classical Baum-Welch algorithm), it will be noted that the parameter M is not generated as part of the algorithm per se. In such a situation, the parameter M can be selected either randomly or using prior information, and this parameter may be updated during the training process (for example, in an ad hoc manner), in order to increase the accuracy of the model If desired, during training, the HMM parameters computed using the Baum-Welch algorithm (or an equivalent method) can be verified using a Viterbi algorithm. For example, the observation sequence, and the corresponding HMM parameters computed using the Baum-Welch algorithm, can be fed as an input to the Viterbi algorithm, which will compute the most-likely state sequence given the observation sequence and the corresponding HMM parameters. The most-likely state sequence output from the Viterbi algorithm can then be compared to the state sequence expected from the training sequence. Further training using additional training sequences can be performed if there is a discrepancy between the most-likely state sequence output from the Viterbi algorithm and the expected state sequence. A stopping point is typically defined, such that when the discrepancy is below a predetermined threshold, training using additional training sequences ceases.

Once the model parameters are established, the predetermined sequences of data can be considered to be observation sequences of a hidden markov process of the HMM, and corresponding most-likely state sequences can be generated. Meaningful inferences may then be assigned to at least some of these states. For example, in a territorial security application, based on the predetermined sequences of data, it may be determined that a given state of the hidden markov process represents the inference that a vehicle is present. The mapping of meaningful inferences to states of the model is sometimes referred to as "state-concept mapping".

Once the training is complete, the data fusion engine 202 is ready for actual operation to accept 'live' data and perform data fusion. Therefore, in step 304 the data fusion engine 202 receives this data from the one or more data sources 201, fuses the data, and updates the parameters of the model during operation as necessary.

The fusion process and the method of updating the parameters during operation subsequent to training is described below with reference to FIG. 4 in the context of an embodiment in which the data fusion engine 202 comprises a single HMM implemented by data fuser 204. Other embodiments of the data fusion engine 202, including ones in which a plurality of HMMs are arranged hierarchically in layers, will be described later.

First, in step 402, an input is received at the data fuser 204. For example, in one embodiment, the input is raw data from a single data source; in another embodiment, the input is a feature extracted from a single data source; in another embodiment, the input is concatenated or multiplexed raw data from two or more data sources; and in another embodiment, the input is concatenated or multiplexed features extracted from each of two or more data sources. In general, the input comprises information that has been obtained using data from at least one of the data sources.

In step 404, the data fuser 204 processes the input in accordance with the model parameters to derive a state of a hidden markov process of the HMM. In some embodiments, this is achieved as follows:

(1) The data fuser 204 implements a HMM with model parameters stored in memory 212 that have previously been established during a training phase using a set of training data (e.g. as in step 302 of FIG. 3).

(2) The data fuser 204 considers the input to the data fuser 204 (received at step 402) to be an observation of the hidden markov process.

(3) The data fuser 204 stores k previous observations (i.e. the k previous inputs to the data fuser 204). For example, in one embodiment, k=3. These previous observations can be stored in the memory 212 or in another memory (not shown).

(4) The data fuser 204 executes the Viterbi algorithm with the input to the Viterbi algorithm comprising the HMM parameters stored in memory 212 and an observation sequence consisting of the current observation and the k previous observations.

(5) The output of the Viterbi algorithm represents the most-likely state sequence. The last state in the most-likely state sequence is the state the hidden markov process is most likely in given the input received at step 402. This most likely state is the state of the hidden markov process output by the data fuser 402.

For example, assume that the input to the data fuser 204 at time t is data from a motion sensor in area A indicating "motion detected", concatenated or appended to data representing a feature extracted from raw data from an image sensor in area A indicating "a vehicle". This is considered to be the observation of the hidden markov process. The state the hidden markov process is in (or is most likely in) given this observation is determined using the Viterbi algorithm, as described in steps (1) to (5) above. This state is the output of the data fuser 204 and in general is representative of an inference (for example, "a vehicle is moving").

The state generated by the data fuser 204 in step 404 is the state of a hidden markov process derived from the input to the data fuser 204. It will be appreciated that this state may or may not be the actual state the hidden markov process is in at this step of the markov process. Rather, it is more accurately the state the hidden markov process is assumed to be in given the input to the data fuser 204. However, as used herein, this state derived in step 404 will be referred to as "the state of the hidden markov process".

Returning to FIG. 4, next, in step 406, a prediction of the next state of the hidden markov process is obtained. In one embodiment, this is achieved as follows: the state output by the data fuser 204 is fed to a predictor 206, and the predictor 206 processes the state in accordance with the HMM parameters to generate the predicted next state. Specifically, the predictor 206 first retrieves the state transition matrix A from the memory 212 and then selects the predicted next state as the state the hidden markov process is most likely to be in at the next step or iteration in the hidden markov process given the current assumed state (i.e. given the output from the data fuser 204).

In an alternative embodiment, the predicted next state may instead be received from another layer in the data fusion engine 204. This alternative embodiment will be described in detail later with respect to FIG. 8.

In step 408, a next input is received at the data fuser 204. For example, as discussed with reference to step 402, the next input may be raw data from a single data source, a feature extracted from a single data source, concatenated or multiplexed raw data from two or more data sources, or concatenated or multiplexed features extracted from each of two or more data sources. In general, the next input comprises additional information that has been obtained using data from at least one of the data sources.

In step 410, the data fuser 204 processes the next input in accordance with the model parameters to derive a next state of the hidden markov process of the HMM. For example, this can be achieved in the same manner as described in step 404. This next state of the hidden markov process is the next output of the data fuser 204.

Again, the next state generated by the data fuser 204 in step 410 is the state of the hidden markov process derived from the next input to the data fuser 204. It will be appreciated that this state may or may not be the actual next state the hidden markov process is in at the next step of the markov process. Rather, it is more accurately the next state the hidden markov process is assumed to be in given the next input to the data fuser 204. However, as used herein, this state derived in step 410 will be referred to as "the next state of the hidden markov process".

Next, in order to determine whether the parameters of the HMM need to be updated during operation, a comparison is made between either (i) the next input to the data fuser 204 (obtained in step 408) and a prediction of the next input, or (ii) the next state of the hidden markov process (obtained in step 410) and the predicted next state (obtained in step 406). The embodiment illustrated in FIG. 4 will assume (i), that is, a comparison is made between the next input to the data fuser 204 and a prediction of the next input. The alternative comparison (ii) will be described later.

Therefore, in step 412, the predictor 206 obtains the predicted next input from the predicted next state. The predicted next input corresponds to the predicted next state and is directly derivable from the predicted next state. In some embodiments, this is achieved as follows: the predictor 206 retrieves the emission probabilities stored in memory 212 for the predicted next state and selects the corresponding predicted next input to the data fuser 204 as the most likely observation given this predicted next state. The predictor 206 then transmits this predicted next input to the comparator 208.

In step 414, the comparison is made in the comparator 208 between the next input and the predicted next input, and the comparator 208 determines whether there is a discrepancy between the next input and the predicted next input. If there is no discrepancy (i.e. if the values match), then it is not necessary to modify the established model parameters. In this case, the method continues by repeating the same operations for the next input; i.e., by returning to step 406 and considering the next input previously obtained in step 408 as the input of step 402.

On the other hand, if there is a discrepancy between the next input and the predicted next input, the comparator 208 flags this discrepancy and the method proceeds to step 416.

As a simple example, the predicted next input may be an observation representative of the information "motion is detected and a vehicle is present", but the actual next input is an observation representative of the information "no motion is detected and a vehicle is present". In this case, the comparator 208 would flag a discrepancy and proceed to step 416.

As shown in FIG. 2, a delay block 207 is interposed between the predictor 206 and the comparator 208. The delay block 207 delays the output of the predictor 206 by one step or iteration in the hidden markov process to ensure that the comparator 208 is comparing the predicted next input to the next input (rather than the current input).

A discrepancy between the values compared in step 414 suggests that the parameters of the model stored in memory 212 may be further optimized. Therefore, in step 416, the comparator 208 transmits a message to the parameter modifier 210 indicating that there is a discrepancy between the actual and predicted values.

In response, in step 418, the parameter modifier 210 obtains from the data fusion engine 202 the next input (from step 408) and uses this next input to modify the parameters of the HMM stored in memory 212. In some embodiments, this is achieved as follows: the parameter modifier 210 adjusts the HMM parameters to maximize the probability of the actual next observation of the HMM (i.e. the probability of the actual next input to the data fuser 204) given the HMM parameters. Methods for modifying the HMM parameters to maximize this probability can be achieved, for example, using the known Baum-Welch algorithm (using as an input to the Baum-Welch algorithm an observation sequence of one observation consisting of the actual next observation), or an equivalent expectation-maximization (EM) method, or using a known gradient or optimization technique.

In other embodiments, modification of the parameters of the HMM by the parameter modifier 210 is instead achieved as follows: the parameter modifier 210 stores in its memory (or alternatively in memory 212) during operation of the data fusion engine 202 a sequence of previous observations; to modify the parameters, the parameter modifier 210 obtains a sequence of observations comprising the actual observation corresponding to the observation predicted in error and n previous observations; the HMM parameters stored in memory 212 are then adjusted by the parameter modifier 210 to maximize the probability of this observation sequence given the HMM parameters. A method for modifying the HMM parameters to maximize this probability can be implemented, for example, using the known Baum-Welch algorithm, an equivalent expectation-maximization (EM) method, or using a known gradient or optimization technique.

After the completion of step 418, the method continues by repeating the same operations for the next input; i.e., by returning to step 406 and considering the next input previously obtained in step 408 as the input of step 402.

As mentioned above, in an alternative embodiment, a comparison is instead made between the next state of the hidden markov process derived in step 410 and the predicted next state obtained in step 406. In this alternative embodiment, the steps of FIG. 4 remain the same, except that step 412 is omitted and in step 414 a comparison is instead made between the next state (obtained in step 410) and the predicted next state (obtained in step 406). The comparator 208 in FIG. 2 would instead have one of its inputs fed from the output of the data fuser 204, rather than the input of the data fuser 204.

Figure 4:
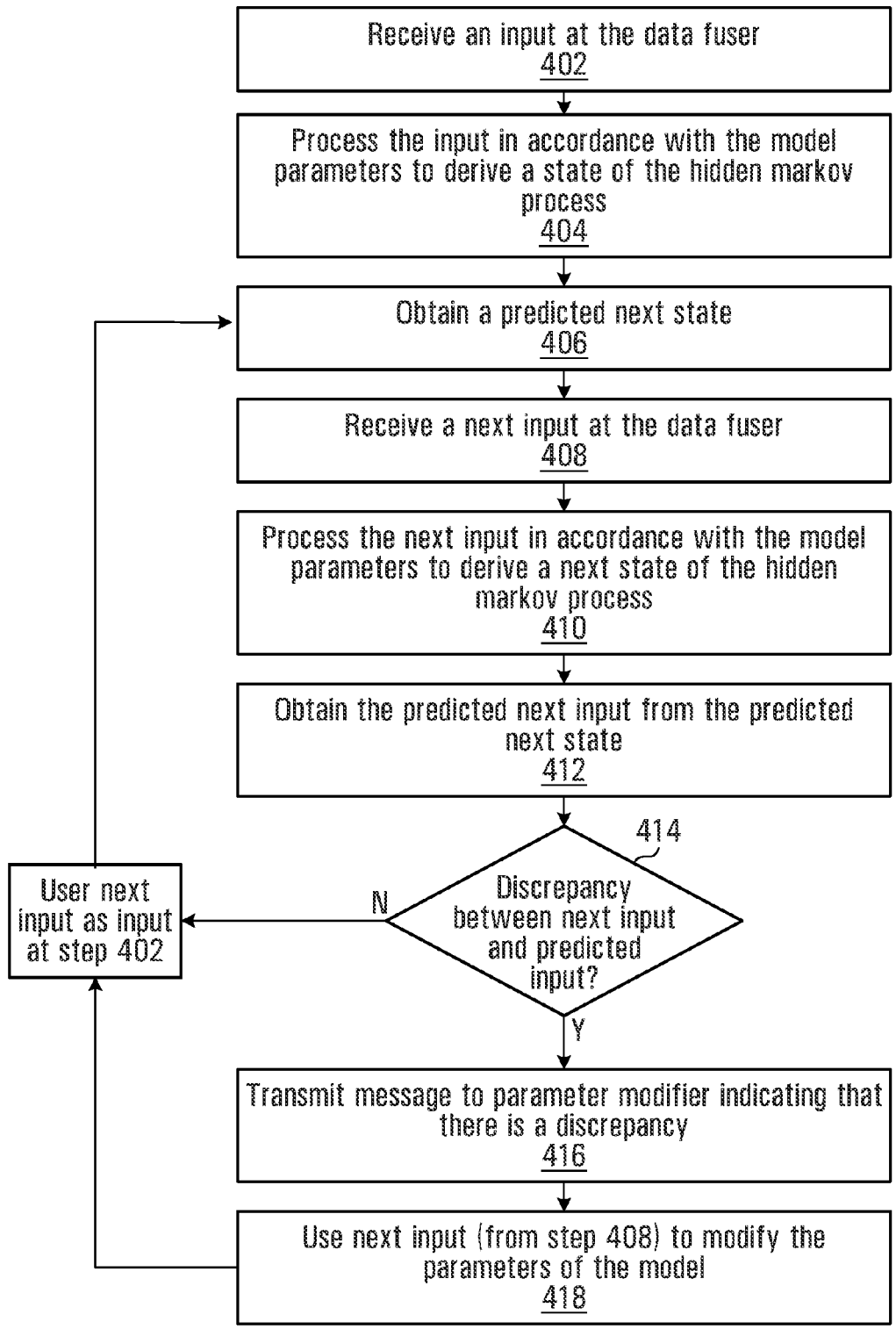
FIG. 4 is a flow diagram of an exemplary method of performing data fusion and adaptively modifying the parameters of the stochastic model used to implement data fusion.

It can be seen that by performing the method of FIG. 4, the data fusion engine 202 is able to adaptively modify its established model parameters during operation subsequent to training. The model parameters established during the training period may be modified during subsequent operation to strive to improve the accuracy of the fusion and/or to strive to track any discrepancies between the training data used to establish the model parameters and the actual input data received over time during subsequent operation of the engine 202.

In some embodiments, the output of the predictor 206 can also be used by the data fusion engine 202 to replace actual inputs that are distorted or non-existent during operation. One such embodiment is described with reference to FIG. 5.

Figure 5:
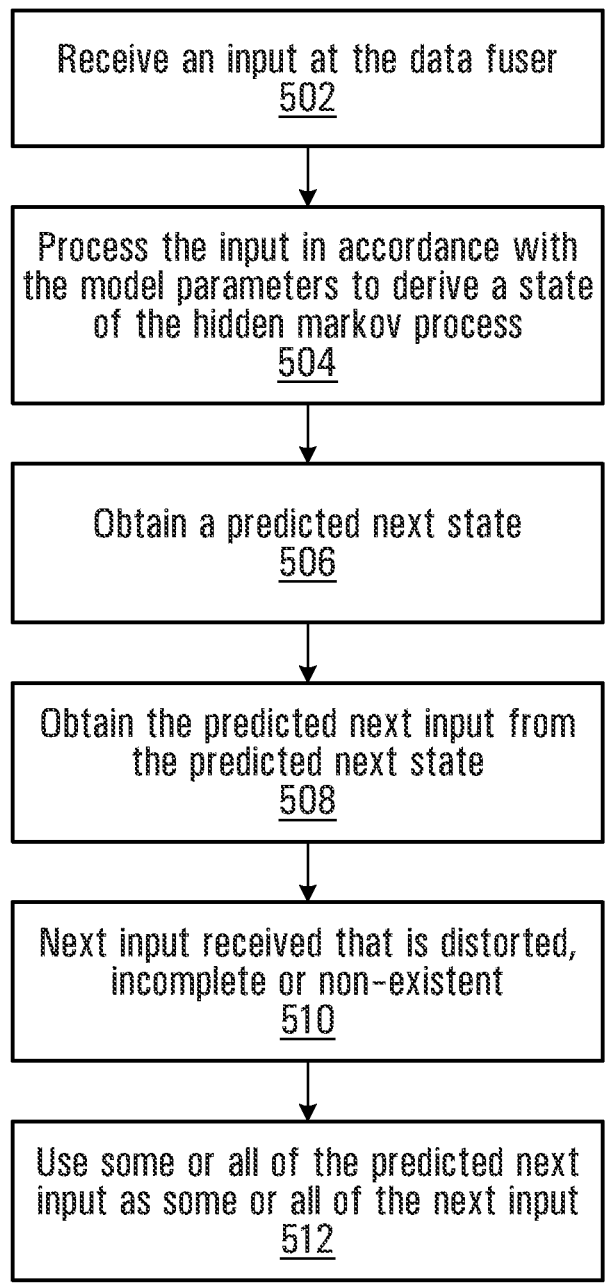
FIG. 5 is a flow diagram of an exemplary method of using a prediction to replace some or all of a next input.

Steps 502 to 508 of FIG. 5 mirror steps 402 to 406 and step 412 of FIG. 4. That is, first in step 502, an input is received at the data fuser 204. Then, in step 504, the data fuser 204 processes the input in accordance with the model parameters to derive a state, for example, in the manner described with respect to step 404 of FIG. 4. Next, in step 506, a prediction of a next state of the hidden markov process is obtained, for example, in the manner described with respect to step 406 of FIG. 4.

In step 508, the predictor 206 then obtains a predicted next input from the predicted next state, for example, in the manner described with respect to step 412 of FIG. 4.

Next, in step 510, either a next input is received that is distorted, or the next input is non-existent or incomplete because, for example, one of the data sources has no data to provide (e.g. nothing is sensed at a sensor).

In step 512, the data fusion engine 202 controls the data fuser 204 to use some or all of the predicted next input (from step 508) as some or all of the next input (in step 510).

By performing the method of FIG. 5, the data fusion engine 202 is able to utilize the predictions to supplement or enhance performance of the engine 202 when actual inputs are non-existent or distorted by noise. For example, assume a first input to the data fuser 204 (at step 502) is data from a motion sensor in area A at time t indicating "motion detected", concatenated or appended to data representing a feature extracted from raw data from an image sensor in area A at time t indicating "a vehicle". Further assume that the next input to the data fuser 204 (at step 510) is only data from a motion sensor in area A at time t+1 indicating "no motion detected". The image sensor does not provide any data at time t+1, for example, because it has been disabled (for example, by the action module 214). The portion of the predicted next input (in step 508) corresponding to the non-existent next data from the image sensor can therefore instead be provided to the input to the data fuser 204, since there is no actual next input from the image sensor.

Figure 6:
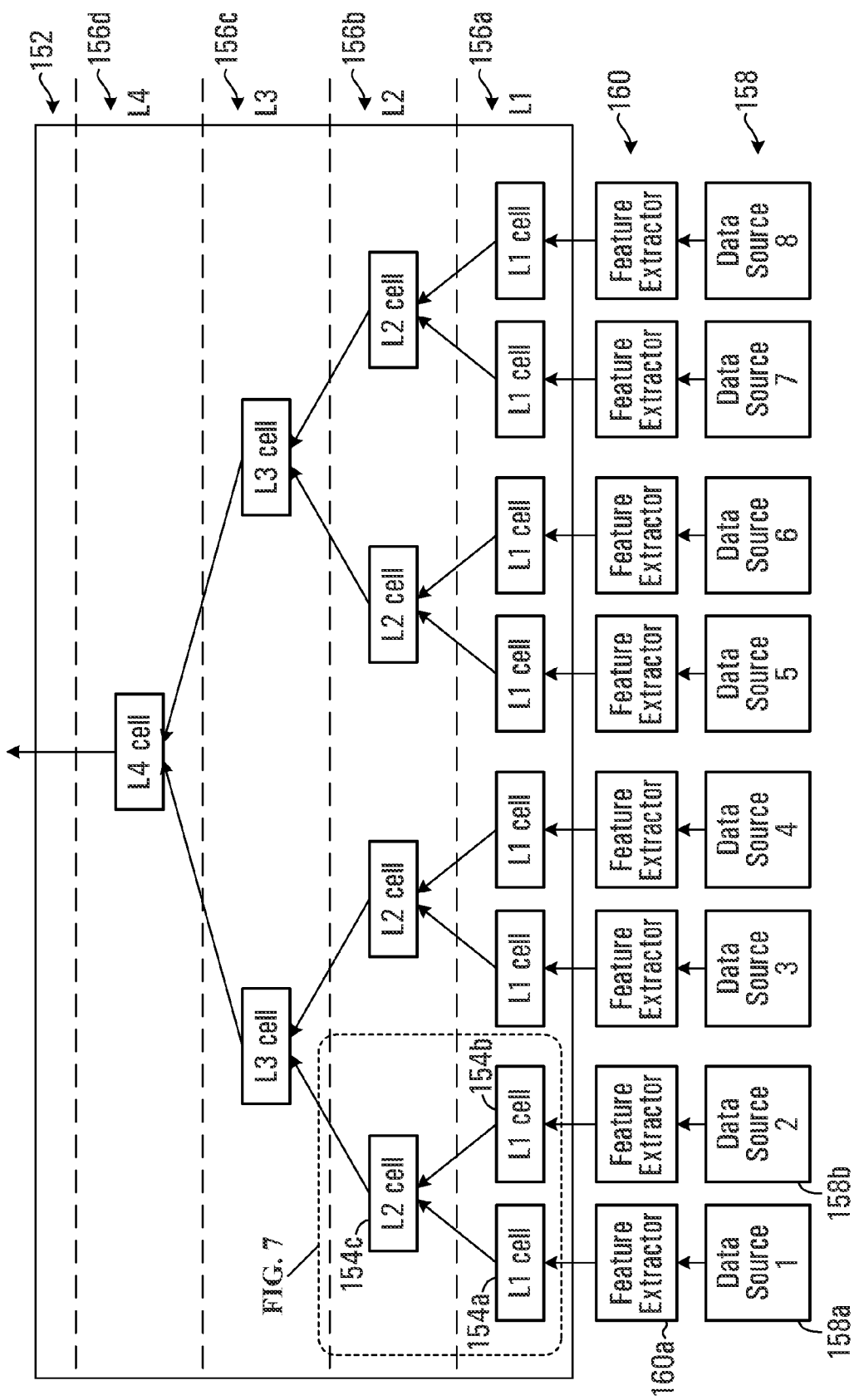
FIG. 6 is a block diagram of an example implementation of another data fusion engine.

Turning now to FIG. 6, another exemplary embodiment of a data fusion engine 152 is shown. The data fusion engine 152 is another representative example of the data fusion engine 206 in the territorial security system 204 in FIG. 1, and the methods described below with reference to the data fusion engine 152 can also be applied to the data fusion engine 206.

The data fusion engine 152 comprises a plurality of cells arranged in a layered hierarchical structure. Specifically, each layer comprises at least one cell and the layers are arranged hierarchically, such that there is a top layer, m middle layers (where in general m is an integer greater or equal to zero) and a bottom layer. The input of each cell in each of the top and middle layers is obtained from the output of two of the cells in an adjacent lower layer, such that the layered hierarchical structure has the form of a pyramid with the top layer comprising a single cell and the bottom layer having the greatest number of cells. The input of the data fusion engine 152 feeds into the cells of the bottom layer, and the output of the data fusion engine 152 is the output of the single cell of the top layer.

The embodiment illustrated in FIG. 6 shows four layers 156a to 156d, although more or fewer layers are possible. Additionally, more or fewer data sources are possible, although the data fusion engine 152 illustrated in FIG. 6 only shows eight data sources. Moreover, the pyramidal structure illustrated in FIG. 6 is only one example, and in general each of the layers can have more or fewer cells, and the input of each cell in the top and middle layers can be obtained from the output of any number of cells in an adjacent lower layer. As used herein, a lower layer "adjacent" to a top or middle layer is a lower layer in which a cell resides that communicates its output to that top or middle layer. The adjacent lower layer may itself be a middle layer.

In FIG. 6, each cell in the bottom layer, layer 156a, corresponds to a respective data source of a bank of data sources 158. For example, as shown in FIG. 6, cell 154a corresponds to the data source 158a. Additionally, in the embodiment illustrated in FIG. 6, a bank of feature extractors 160 is provided, each feature extractor being interposed between each data source and its respective cell in the bottom layer 156a. For example, as shown in FIG. 6, feature extractor 160a is interposed between data source 158a and cell 154a.

Data source 158a and feature extractor 160a will be described in more detail below, it being appreciated that the other data sources and feature extractors illustrated in FIG. 6 operate in a similar manner.

The data source 158a supplies raw data to the feature extractor 160a. The data source 158a may be, for example, one of the plurality of data sources illustrated in FIG. 1. As an example, data source 158a can be data from a sensor that provides sensor readings of an environment, or non-sensed data, for example, data stored in one or more data bases, such as a collection of operational reports.

The data from data source 158*a* is transmitted to feature extractor 160*a*. The purpose of the feature extractor 160*a* is to extract features from the raw data from data source 158*a* and to transmit only these features to the data fusion engine 152. This allows the data fusion engine 152 to operate more efficiently, as only extracted features have to be fused, rather than raw data itself. The quantity of data representing extracted features is typically less than and more manageable than a stream of raw data from a data source 158*a*. Methods for feature extraction are known and will not be described in detail herein.

In some embodiments, the bank of feature extractors 160 may also convert each of the features from the dissimilar data sources into a homogeneous representation. This allows the data fusion engine 152 to potentially operate more efficiently and/or be more scalable, as each cell in layer 156*a* is dealing with incoming data of the same format. In some embodiments, the extracted features are represented by wavelet coefficients so that all of the extracted features from each feature extractor of the bank of feature extractors 160 have a homogeneous representation consisting of a set of wavelet coefficients. Wavelet coefficients are also known and will not be described in detail herein. The following document, incorporated herein by reference, provides a high-level tutorial overview of wavelet coefficients: D. Mackenzie et al., "*Beyond Discover: Wavelets: Seeing the Forest—and the Trees*", *National Academy of Sciences*, December 2001.

It will be understood that the use of the bank of feature extractors 160 in the embodiment illustrated in FIG. 6 is optional, but if the feature extractors 160 are utilized, many different representations for the extracted features are possible; wavelet coefficients are only one possible representation.

As mentioned above, each of the data sources 158 can provide sensed or non-sensed data. An example of non-sensed data is an operational report in the form of an unformatted data format. For example, a human security guard could perform a nightly patrol and record his observations in a computer. In this case, the data source would provide the recorded text from the computer and the corresponding feature extractor would require the additional step of mapping this unformatted text to a structured data format in order to allow features to be extracted. U.S. Pat. No. 7,599,952, incorporated herein by reference, is one example of a method for mapping unstructured data text to a structured data format.

The feature extractors 160 illustrated in FIG. 6 are shown as being external to the data fusion engine 152. For example, one or more of the feature extractors 160 can be in the supporting architecture (if there is any), such as in the perception module 210 in the embodiment illustrated in FIG. 1. Alternatively or additionally, one or more of the feature extractors 160 can be part of the hardware of the corresponding data source. For example, data source 158*a* may be a sensor on a mobile platform and feature extractor 160*a* may also be mounted on the platform. The feature extractor 160*a* would then communicate wirelessly to the data fusion engine 152. Alternatively, one or more of the feature extractors 160 could be part of the data fusion engine 152, although this is not illustrated in FIG. 6.

The data fusion engine 152 illustrated in FIG. 6 implements an upward hierarchical structure such that each cell receives data from a lower layer and provides data to an upper layer. In this embodiment, there is no transmission of data downward in the hierarchical structure from an upper layer to a lower layer. Another embodiment of a data fusion engine that implements a bi-directional hierarchical structure will be described later with reference to FIGS. 8-12.

Figure 7:
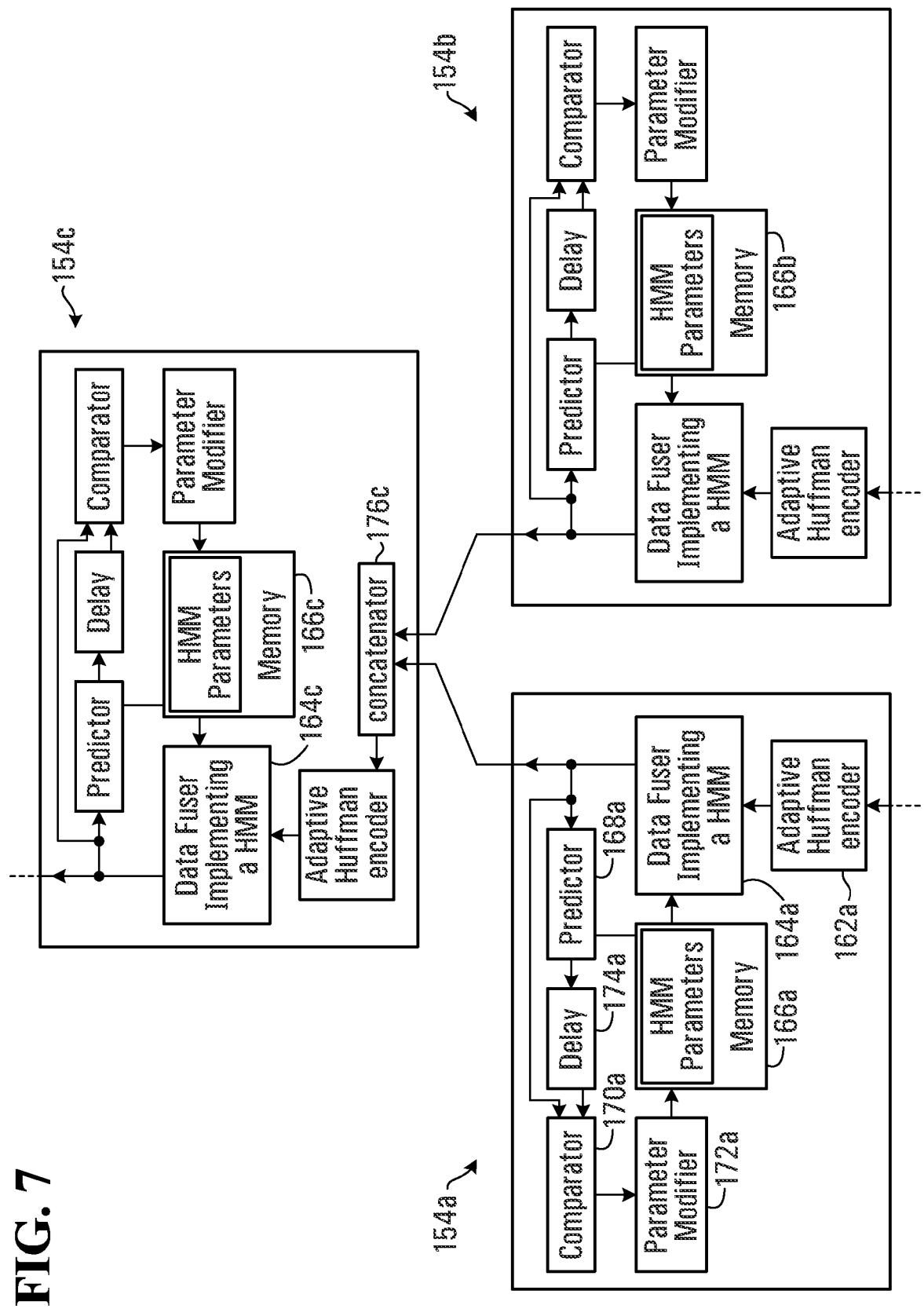
FIG. 7 is a block diagram showing components of FIG. 6 in more detail.

Cells 154*a-c* of the data fusion engine 152 are shown in greater detail in FIG. 7, it being understood that the other cells in the hierarchical structure have a similar structure and operation.

Turning first to cell 154*a*, the output from the feature extractor 160*a* is first fed to an adaptive Huffman encoder 162*a*. The purpose of the adaptive Huffman encoder 162*a* is to map the input into a compact representation. An example of an Adaptive Huffman Encoding method is described, for example, in J. Vitter, "*Design and Analysis of Dynamic Huffman Codes*", *Journal of the Association for Computing Machinery*, Vol. 34, No. 4, October 1987, pp. 825-845, incorporated herein by reference. The output of the adaptive Huffman encoder 162*a* is fed to a data fuser 164*a*, which implements a HMM using the HMM parameters stored in memory 166*a*. The HMM parameters were previously established during a training period, for example, as described with reference to step 302 of FIG. 3. Cell 154*a* further comprises a predictor 168*a*, a comparator 170*a*, and a parameter modifier 172*a*.

Data fuser 164*a*, predictor 168*a*, comparator 170*a*, and parameter modifier 172*a* operate in the same manner as data fuser 204, predictor 206, comparator 208, and parameter modifier 210 in FIG. 2, and therefore the operation of these components will not be described again. However, it will be noted that in the embodiment illustrated in FIG. 7, the comparator 170*a* is configured to compare the predicted next state of the hidden markov process (i.e. the predicted next output of the data fuser 164*a*) to the actual assumed next state of the hidden markov process (i.e. the actual next output of the data fuser 164*a*).

Cells 154*b* and 154*c* operate in the same manner as cell 154*a* and therefore will not be described in detail. However, cell 154*c* further includes a concatenator 176*c* for concatenating the inputs received from cells 154*a* and 154*b*. Additionally, each input to data fuser 164*c* in cell 154*c* comprises a Huffman encoded concatenation of fused data from cells 154*a* and 154*b*. Regardless, such an input is still ultimately obtained using data from the data sources.

The HMM parameters stored in memory 166*a*, which were established during the training period, may not (and in general will not) be the same as the HMM parameters stored in memory 166*b* in cell 154*b* or the same as the HMM parameters stored in memory 166*c* in cell 154*c*, both of which were also established during the training period. This is because each data fuser in each cell of the plurality of cells in the data fusion engine 152 is trained during the training period using training sequences specific to that cell. As described with reference to step 302 in FIG. 3, each HMM is trained using training sequences comprising data representing what would be expected to be received as an observation of the HMM. In general, the input to each cell (which corresponds to the observation of the HMM implemented in that cell) will be different. For example, the input to cell 154*a* represents features extracted from data source 158*a*, the input to cell 154*b* represents the features extracted from data source 158*b*, and the input to cell 154*c* represents the concatenation of the output of cells 154*a* and 154*b*.

The hierarchical layered arrangement of cells in the data fusion engine 152 may allow for a scalable structure that can provide data fusion that is more sophisticated than a data fusion engine 152 having only a single cell. Notably, each cell has its own data fuser that implements a HMM. The input to each data fuser is interpreted as the observation of its HMM, and the output of each data fuser is the assumed state its hidden markov process is in, which represents fused data.

This fused data is then forwarded to a cell in a higher layer, which also receives fused data from another cell in the lower layer and further fuses this data. The output of the single cell in the highest layer (layer 156*d*) represents the fusion of all of the data sources 158, and is the output of the data fusion engine 152.

Figure 8:
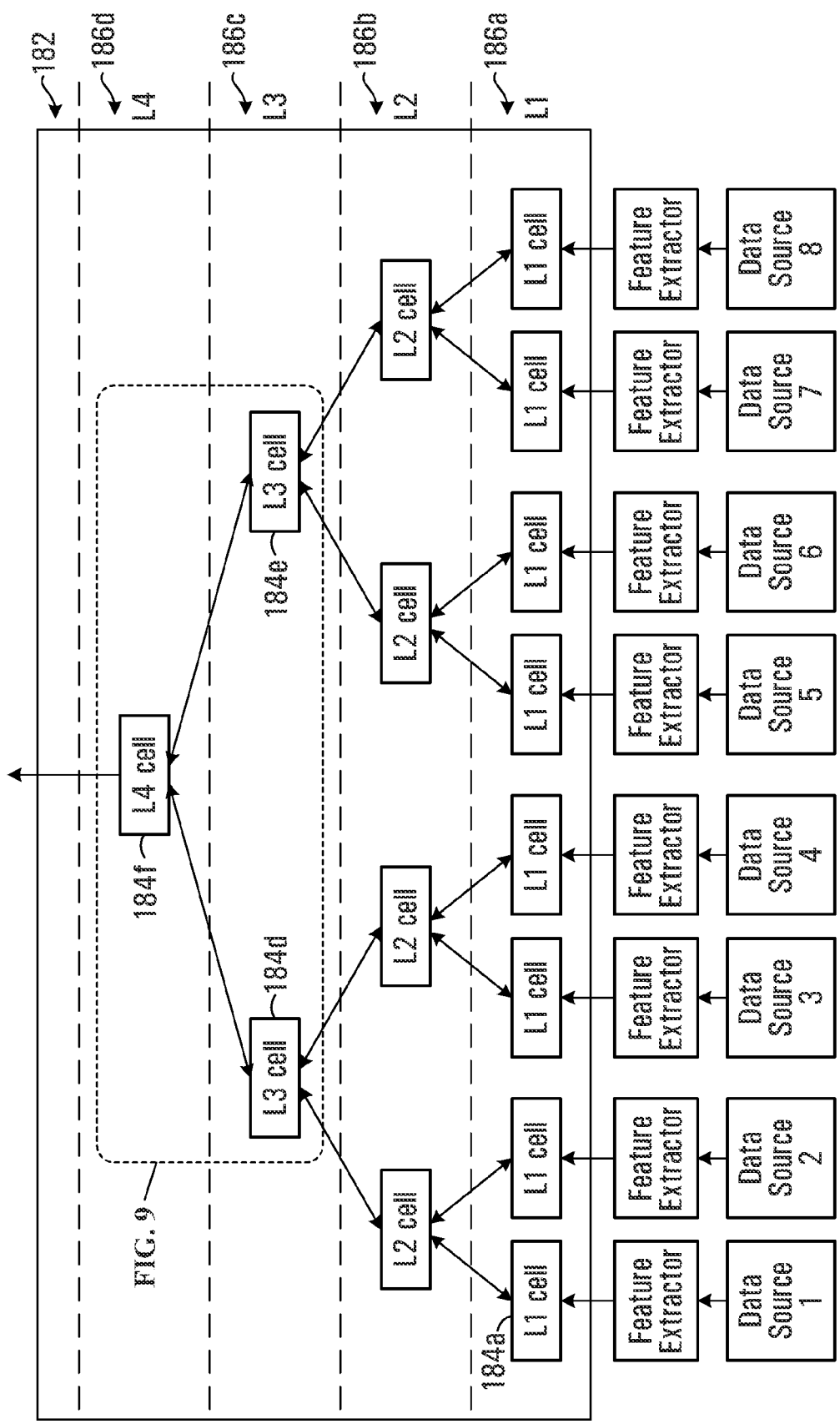
FIG. 8 is a block diagram of an example implementation of yet another data fusion engine.

Turning now to FIG. 8, another exemplary embodiment of a data fusion engine 182 is shown. Like in FIG. 6, the data fusion engine 182 in FIG. 8 also comprises a plurality of cells arranged in a layered hierarchical structure (comprising layers 186*a* to 186*d*). However, the data fusion engine 182 in FIG. 8 implements a bidirectional hierarchical structure such that each cell in layers 186*b* and 186*c* receives data from both an adjacent lower layer and an adjacent upper layer.

Figure 9:
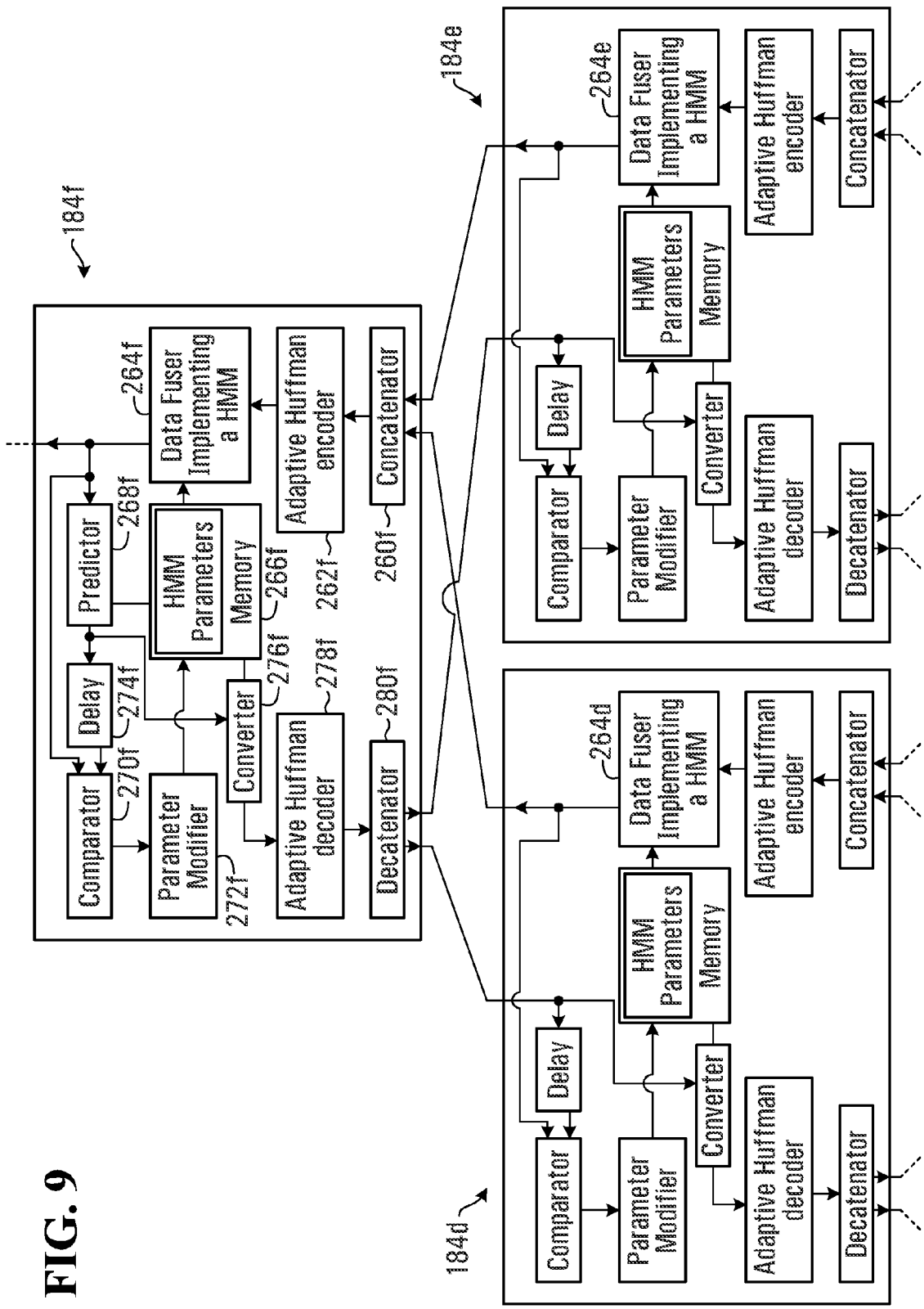
FIG. 9 is a block diagram showing components of FIG. 8 in more detail.

Cells 184*d-f* of the data fusion engine 182 are shown in greater detail in FIG. 9, it being understood that other cells in layers 186*b* and 186*c* have a structure similar to (and operate similar to) cells 184*d* and 184*e*.

Turning first to cell 184*f*, a concatenator 260*f* receives as its input the output of the data fusers 264*d* and 264*e* from cells 184*d* and 184*e* in layer 186*c*. The concatenator 260*f* concatenates these two separate inputs to form a single input, which is fed to an adaptive Huffman encoder 262*f*. The output of the adaptive Huffman encoder 262*f* is fed to a data fuser 264*f*, which implements a HMM using the HMM parameters stored in memory 266*f*. The HMM parameters were previously established during a training period. Cell 184*f* further comprises a predictor 268*f*, a delay block 274*f*, a comparator 270*f*, and a parameter modifier 272*f*.

Adaptive Huffman encoder 262*f*, data fuser 264*f*, predictor 268*f*, delay block 274*f*, comparator 270*f*, and parameter modifier 272*f* operate in the same manner as adaptive Huffman encoder 162*a*, data fuser 164*a*, predictor 168*a*, delay block 174*a*, comparator 170*a*, and parameter modifier 172*a* in FIG. 7. However the output of the predictor 268*f* in cell 184*f*, which represents a prediction of the next output of the data fuser 264*f* (that is, a prediction of the next state of the HMM implemented by the data fuser 264*f*), is also fed to a converter 276*f*. The converter 276*f* converts the prediction of the output of the data fuser 264*f* to the corresponding predicted next input of the data fuser 264*f*. This is achieved as follows: the converter 276*f* retrieves the emission probabilities stored in memory 266*f* for the predicted next state and selects the corresponding predicted next input to the data fuser 264*f* as the most likely observation given this predicted next state. The corresponding predicted next input from converter 276*f* is then sent to an adaptive Huffman decoder 278*f*, which implements adaptive Huffman decoding that reverses the adaptive Huffman encoding of the adaptive Huffman encoder 260*f*. The output of the adaptive Huffman decoder 278*f* is sent to the decatenator 280*f*, which implements the reverse of the concatenation of concatenator 260*f*.

Thus, the output of the decatenator 280*f* represents a prediction of what is expected to be received from each cell 184*d* and 184*e* respectively given the prediction of the next output of the data fuser 264*f*. The prediction of what is expected to be received from cell 184*d* (i.e., the prediction of the output of the data fuser 264*d* in cell 184*d*) is fed back to cell 184*d*, and the prediction of what is expected to be received from cell 184*e* (i.e., the prediction of the output of the data fuser 264*e* in cell 184*e*) is fed back to cell 184*e*.

Cells 184*d* and 184*e* operate in the same manner as cell 184*f*, except that a predictor is not necessary since the prediction of the next output of the data fuser in cells 184*d* and 184*e* is provided by cell 184*f*. That is, in cells 184*d* and 184*f*, each predicted next state is obtained from cell 184*f*.

Figure 10:
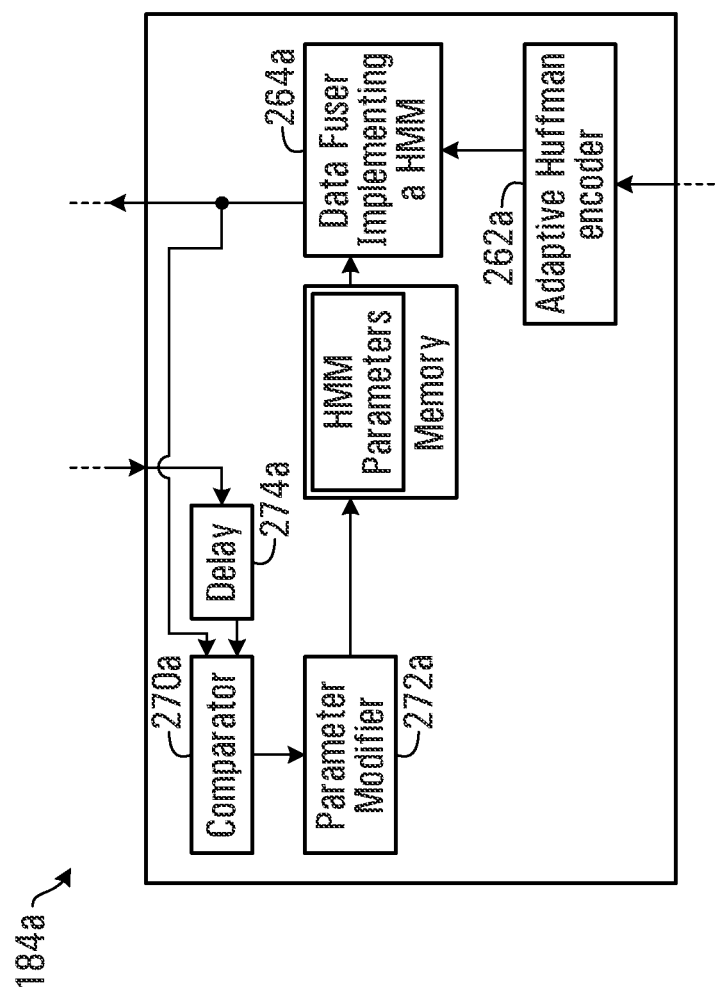
FIG. 10 is also a block diagram showing components of FIG. 8 in more detail.

Cell 184*a* of the data fusion engine 182 is shown in greater detail in FIG. 10, it being understood that the other cells in this layer have a structure similar to (and operate similar to) cell 184*a*. In cell 184*a*, a concatenator is not necessary, as there is only one input, that being from a data source (perhaps via a feature extractor). Also, since cell 184*a* is in layer 186*a*, there are no lower layer cells to send data to, and therefore cell 184*a* does not have a converter or adaptive Huffman decoder. The adaptive Huffman encoder 262*a*, data fuser 264*a*, delay 274*a*, comparator 270*a*, and parameter modifier 272*a* in cell 184*a* work in the same manner as the adaptive Huffman encoder 262*f*, the data fuser 264*f*, the delay 274*f*, the comparator 270*f*, and the parameter modifier 272*f* in cell 184*f*.

Thus, as illustrated in FIGS. 8-10, all of the cells in the data fusion engine 182, except for the cells in the bottom layer 186*a*, send to cells in a lower layer a prediction of the next output of the cells in the lower layer. As a result, the cells in all of the layers except the top layer 186*d* do not require a predictor to predict the next output of their data fuser, as the prediction of the next output of their data fuser is provided by a cell in an upper layer. Of course, as described above, once the actual next input is received by each cell, the comparator and parameter modifier in each cell operates as described earlier to modify as necessary the established parameters of the HMM implemented in each cell.

Figure 12:
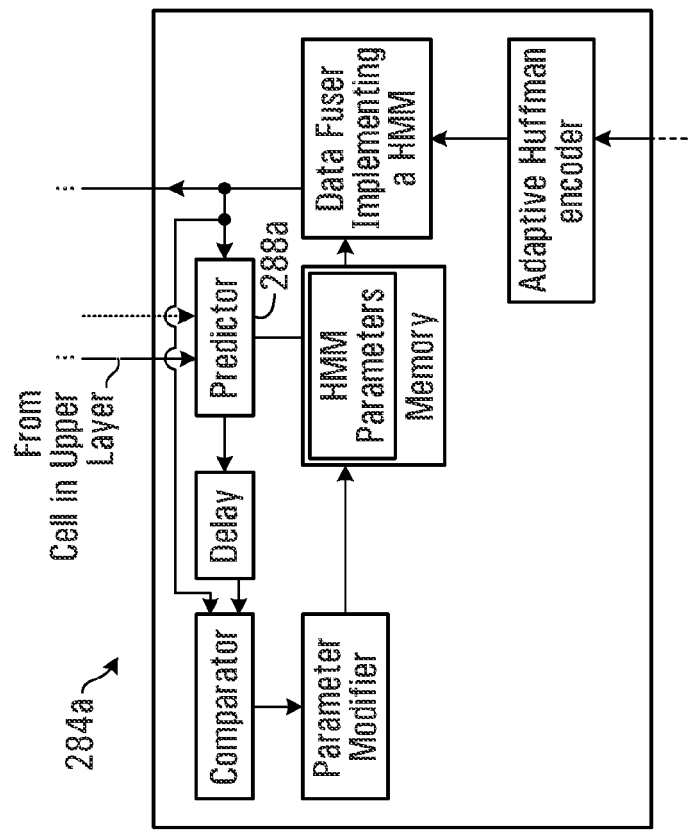
FIG. 12 is a block diagram showing a variation of a cell in FIG. 10.
Figure 11:
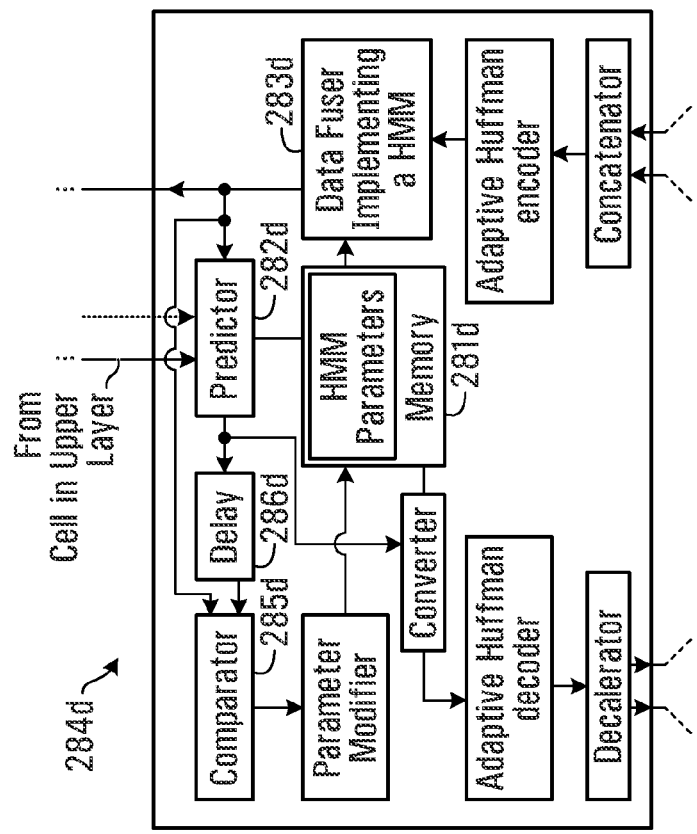
FIG. 11 is a block diagram showing a variation of a cell in FIG. 9.

A variation of cells 184*d* and 184*a* are shown in FIGS. 11 and 12 respectively, it being appreciated that the other cells in layers 186*b* and 186*c* can also implement the variation of cell 184*d*, and that the other cells in layer 186*a* can also implement the variation of cell 184*a*. The variation of cell 184*d* is labelled 284*d* and the variation of cell 184*a* is labelled 284*a*.

Cell 284*d* has the same structure as cell 184*d* in FIG. 9, as well as the same operation, except for the following: cell 284*d* additionally includes a predictor 282*d* that receives as its input: (1) the prediction from the cell in the adjacent upper layer, which represents a first prediction of the next output of the data fuser 283*d* of cell 284*d*, and (2) the current output of the data fuser 283*d*. The predictor 282*d* processes the current output of the data fuser 283*d* to determine a second prediction of the next output of the data fuser 283*d*. This is achieved in the manner described with reference to step 406 of FIG. 4. Specifically, the predictor 282*d* retrieves from memory 281*d* the state transition matrix of its HMM and generates as the second prediction the state the hidden markov process is most likely to be in next (at the next step or iteration in the markov process) given the assumed current state (i.e. given the current output from the data fuser 283*d*). This predicted next state represents the second prediction of the next output of the data fuser 283*d*.

Thus, the predictor 282*d* has two predictions of the next output of the data fuser 283*d*: a first prediction from the cell in the upper layer, and a second prediction derived from the current output of the data fuser 283*d*. The predictor 282*d* can then process both the first prediction and the second prediction in order to potentially provide an overall more accurate prediction to the comparator 285*d*. For example, in some embodiments, the predictor 282*d* is provided with confidence values representing the confidence of the first prediction (from the upper layer cell) and the confidence of the second prediction (generated by the predictor 282*d* from the current output of the data fuser 283*d*). If the first prediction matches the second prediction, then this prediction is the prediction sent from the predictor 282*d* to the comparator 285*d* (via the delay block 286*d*). However, if the first prediction does not match the second prediction, the predictor 282*d* outputs as its prediction the prediction having the highest confidence value. In some embodiments, the confidence values are obtained as follows: the confidence value of the first prediction is sent from the cell in the upper layer along with the first prediction, and it is a probability that the hidden markov process in the upper cell will transition to the predicted next state; and the confidence value of the second prediction is obtained by the predictor 282d from the HMM parameters of cell 284d stored in memory 281d, and it is a probability that the hidden markov process in cell 284d will transition to the predicted next state.

In some embodiments, it is contemplated that the predictor 282d can also use other information from the data fusion engine (such as predictions from additional other cells in higher layers or in the same layer) to potentially enhance the accuracy of its prediction. The stippled line that feeds into the predictor 282d in FIG. 11 represents the input of such other information.

Cell 284a is shown in FIG. 12. Cell 284a has the same structure as cell 184a in FIG. 10 and the same operation, except for the addition of predictor 288a, which operates in the same manner as predictor 282d in cell 284d.

The variation illustrated in FIGS. 11 and 12 has the potential to increase the performance of the data fusion engine 182, but in general may add implementation complexity due to the use of multiple predictions.

Thus, as illustrated above, the data fusion engines disclosed herein can be implemented in a variety of structures, including in a single-cell structure (such as in the embodiment illustrated in FIG. 2), or in a layered hierarchical structure comprising a plurality of cells, each cell having its own HMM (as in the embodiments illustrated in FIGS. 6-12).

The components of the data fusion engines described herein, such as the data fusers, predictors, parameter modifiers, and converters, may represent functionality implemented in one or more of hardware, firmware, or software in combination with a processor unit to run the software. For example, each of the data fusion engines described herein may be a module or an application comprising instructions stored on hardware (distributed or not distributed), firmware, or any other computer-readable medium that, when executed by a processing unit, perform the functions of the data fusion engines described herein. Examples of computer-readable media were described earlier. A non-exhaustive list of systems and computer-readable media on which the data fusion engines may be implemented include: processing units (microprocessors, multiprocessors, microcontrollers, computer processing units, etc.), Field Programmable Gate Arrays (FPGAs), parallel systems, Application Specific Integrated Circuits (ASICs), programmable logic devices, and memory (volatile or non-volatile). The data fusion engine may also be implemented across a network or across a plurality of physically distinct and separate processing devices.

Figure 13:
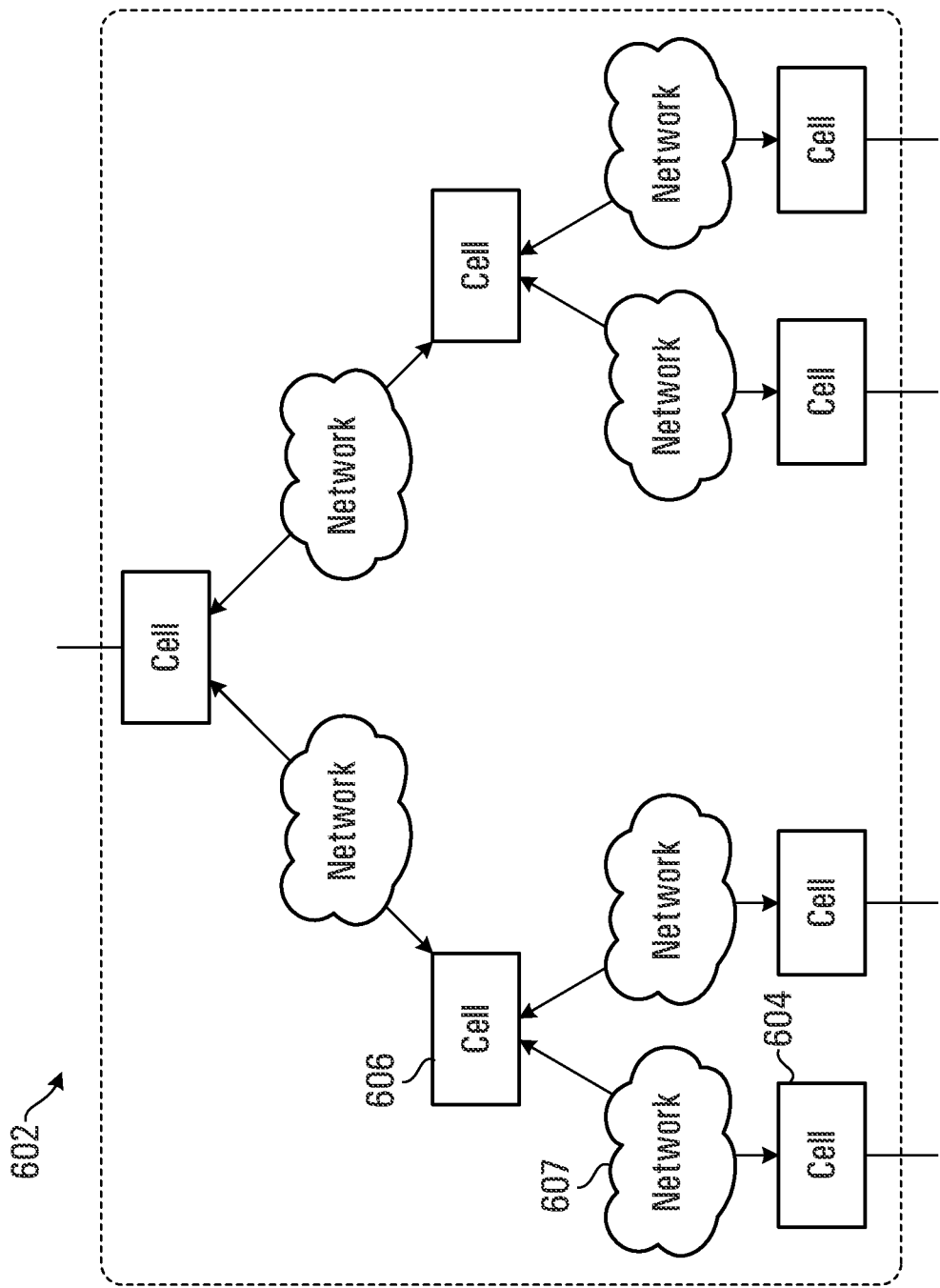
FIG. 13 is a block diagram illustrating an example implementation of still another data fusion engine.

As one example, FIG. 13 illustrates a data fusion engine 602 implemented across a network. Each node in the data fusion engine 602, such as node 604 includes a computer-readable medium (e.g. a server or a partition of memory), that has stored thereon instructions for implementing one cell in the layered hierarchical structure. The nodes communicate with each other over one or more networks. For example, as illustrated in FIG. 13, node 604 communicates with node 606 over network 607. As an example, each of the nodes may represent a server in a distributed network. As another example, each of the nodes may represent one sensor of a network of sensors that communicate with each other wirelessly (e.g. a sensor-and-actuator network (SANET)).

All of the embodiments illustrated above are described in the context of a territorial security system in which the data sources feeding the data fusion engine are collecting data relating to an area, object, or event being monitored. However, the data fusion engine embodiments described herein are not limited to such an application, and in fact are suitable for any application in which data from a plurality of data sources can be fused to make an inference. For example, any one of the data fusion engines described herein could be implemented in a health care setting in which the data sources collect data relating to the health of an individual or individuals (e.g. heart rate, blood pressure, etc.), and in which the data fusion engine provides an output representing the fusion of this information. Based on the inference made by the data fusion engine, a health care professional could be alerted and/or treatment parameters could be modified. Examples of other applications in which it may be desired to fuse data include monitoring of manufacturing processes, environmental monitoring, command and control, business intelligence and emergency management.

Although the foregoing has been described with reference to certain specific embodiments, various modifications thereof will be apparent to those skilled in the art without departing from the scope of the claims appended hereto.

The invention claimed is:

1. A method for performing the fusion of data in a data fusion engine, the method comprising:
    (a) receiving an input at a data fuser in the data fusion engine;
    (b) processing the input in the data fuser in accordance with parameters of a stochastic model to derive a state of a stochastic process of the stochastic model, the parameters of the stochastic model previously established during a training period;
    (c) obtaining a predicted next state of the stochastic process;
    (d) receiving a next input at the data fuser and processing the next input in the data fuser in accordance with the parameters of the stochastic model to derive a next state of the stochastic process;
    (e) comparing either (i) the next state and the predicted next state, or (ii) the next input and a predicted next input corresponding to the predicted next state and derived from the predicted next state;
    (f) if there is a discrepancy between that compared in (e), then using the next input to modify the parameters of the stochastic model;
wherein the stochastic model is a hidden markov model, wherein the stochastic process of the stochastic model is a hidden markov process of the hidden markov model, wherein said parameters of the stochastic model are parameters of the hidden markov model, and the parameters of the hidden markov model include at least one of: hidden states of the hidden markov model, observations for hidden states of the hidden markov model, a state transition matrix, and emission probabilities for the observations of the hidden states;
wherein the data fusion engine comprises a plurality of cells arranged in a layered hierarchical structure having a bottom layer, a top layer, and m middle layers; wherein an input of each cell in the top layer and the middle layers is obtained from an output of at least one cell in an adjacent lower layer; and wherein operations (a) to (f) are performed in one or more cells of the plurality of cells.

2. The method of claim 1 wherein operations (a) to (f) are performed in each cell of the plurality of cells, and wherein the output of the at least one cell in each adjacent lower layer comprises an assumed state of a hidden markov process of the at least one cell.

3. The method of claim 2 further comprising:
each cell in the top layer and the middle layers deriving from its predicted next state: a predicted next state of a corresponding cell in its adjacent lower layer; and
each cell in the top layer and the middle layers transmitting to the corresponding cell the predicted next state of the corresponding cell.

4. The method of claim 2 wherein said using the next input to modify the parameters of the hidden markov model comprises:
providing the next input as an input to a Baum-Welch algorithm to generate modified parameters of the hidden markov model.

5. The method of claim 3 wherein said obtaining the predicted next state comprises:
obtaining from the state transition matrix the predicted next state by selecting from the state transition matrix a most likely state at a next step of the hidden markov process given said state.

6. A data fusion engine for performing the fusion of data comprising:
a data fuser implementing a stochastic model;
a memory for storing parameters of the stochastic model;
a comparator; and
a parameter modifier for modifying parameters of the stochastic model;
the data fusion engine for:
(a) receiving an input at the data fuser;
(b) processing the input in the data fuser in accordance with parameters of the stochastic model to derive a state of the stochastic process, the parameters of the stochastic model previously established during a training period;
(c) obtaining a predicted next state of the stochastic process;
(d) receiving a next input at the data fuser and processing the next input in the data fuser in accordance with the parameters of the stochastic model to derive a next state of the stochastic process;
(e) comparing in the comparator either (i) the next state and the predicted next state, or (ii) the next input and a predicted next input corresponding to the predicted next state and derived from the predicted next state;
(f) if there is a discrepancy between that compared in (e), the parameter modifier using the next input to modify the parameters of the stochastic model;
wherein the stochastic model is a hidden markov model, wherein the stochastic process of the stochastic model is a hidden markov process of the hidden markov model, wherein said parameters of the stochastic model are parameters of the hidden markov model, and the parameters of the hidden markov model include at least one of: hidden states of the hidden markov model, observations for hidden states of the hidden markov model, a state transition matrix, and emission probabilities for the observations of the hidden states;
wherein the data fusion engine comprises a plurality of cells arranged in a layered hierarchical structure having a bottom layer, a top layer, and m middle layers; wherein an input of each cell in the top layer and the middle layers is obtained from an output of at least one cell in an adjacent lower layer; and wherein operations (a) to (f) are performed in one or more cells of the plurality of cells.

7. The data fusion engine of claim 6 wherein the data fusion engine is configured to perform operations (a) to (f) in each cell of the plurality of cells, and wherein the output of the at least one cell in each adjacent lower layer comprises an assumed state of a hidden markov process of the at least one cell.

8. The data fusion engine of claim 7, wherein the data fusion engine is further configured for:
each cell in the top layer and the middle layers deriving from its predicted next state: a predicted next state of a corresponding cell in its adjacent lower layer; and
each cell in the top layer and the middle layers transmitting to the corresponding cell the predicted next state of the corresponding cell.

9. The data fusion engine of claim 6 wherein said obtaining the predicted next state comprises:
obtaining from the state transition matrix the predicted next state by selecting from the state transition matrix a most likely state at a next step of the hidden markov process given said state.

10. A non-transitory computer readable medium having stored thereon computer readable instructions for performing the fusion of data in a data fusion engine, the computer readable instructions including instructions for performing operations comprising:
(a) receiving an input at a data fuser in the data fusion engine;
(b) processing the input in the data fuser in accordance with parameters of a stochastic model to derive a state of a stochastic process of the stochastic model, the parameters of the stochastic model previously established during a training period;
(c) obtaining a predicted next state of the stochastic process;
(d) receiving a next input at the data fuser and processing the next input in the data fuser in accordance with the parameters of the stochastic model to derive a next state of the stochastic process;
(e) comparing either (i) the next state and the predicted next state, or (ii) the next input and a predicted next input corresponding to the predicted next state and derived from the predicted next state;
(f) if there is a discrepancy between that compared in (e), then using the next input to modify the parameters of the stochastic model;
wherein the stochastic model is a hidden markov model, wherein the stochastic process of the stochastic model is a hidden markov process of the hidden markov model, wherein said parameters of the stochastic model are parameters of the hidden markov model, and the parameters of the hidden markov model include at least one of: hidden states of the hidden markov model, observations for hidden states of the hidden markov model, a state transition matrix, and emission probabilities for the observations of the hidden states;
wherein the data fusion engine comprises a plurality of cells arranged in a layered hierarchical structure having a bottom layer, a top layer, and m middle layers; wherein an input of each cell in the top layer and the middle layers is obtained from an output of at least one cell in an adjacent lower layer; and wherein operations (a) to (f) are performed in one or more cells of the plurality of cells.

11. The non-transitory computer readable medium of claim 10 wherein operations (a) to (f) are performed in each cell of the plurality of cells, and wherein the output of the at least one cell in each adjacent lower layer comprises an assumed state of a hidden markov process of the at least one cell.

12. The non-transitory computer readable medium of claim 11 wherein the computer readable instructions further include instructions for performing operations comprising:

each cell in the top layer and the middle layers deriving from its predicted next state: a predicted next state of a corresponding cell in its adjacent lower layer; and each cell in the top layer and the middle layers transmitting to the corresponding cell the predicted next state of the corresponding cell.

13. The non-transitory computer readable medium of claim 10 wherein said obtaining the predicted next state comprises:

obtaining from the state transition matrix the predicted next state by selecting from the state transition matrix a most likely state at a next step of the hidden markov process given said state.

14. A territorial security system comprising:

an input for receiving data from a plurality of data sources;

the data fusion engine of claim 6;

an architecture for processing fused data from the data fusion engine to obtain an intelligence product.

\* \* \* \* \*

UNITED STATES PATENT AND TRADEMARK OFFICE
CERTIFICATE OF CORRECTION

PATENT NO. : 8,478,711 B2
APPLICATION NO. : 13/030270
DATED : July 2, 2013
INVENTOR(S) : Abielmona et al.

Page 1 of 1

It is certified that error appears in the above-identified patent and that said Letters Patent is hereby corrected as shown below:

In the Claims

Claim 5, column 17, line 14, delete "claim 3" and replace with -- claim 1 --.

Signed and Sealed this
First Day of October, 2013

Teresa Stanek Rea
*Deputy Director of the United States Patent and Trademark Office*